Oct. 16, 1945.   W. J. MATTOX   2,386,969
PRODUCTION OF XYLENE
Filed Nov. 19, 1943
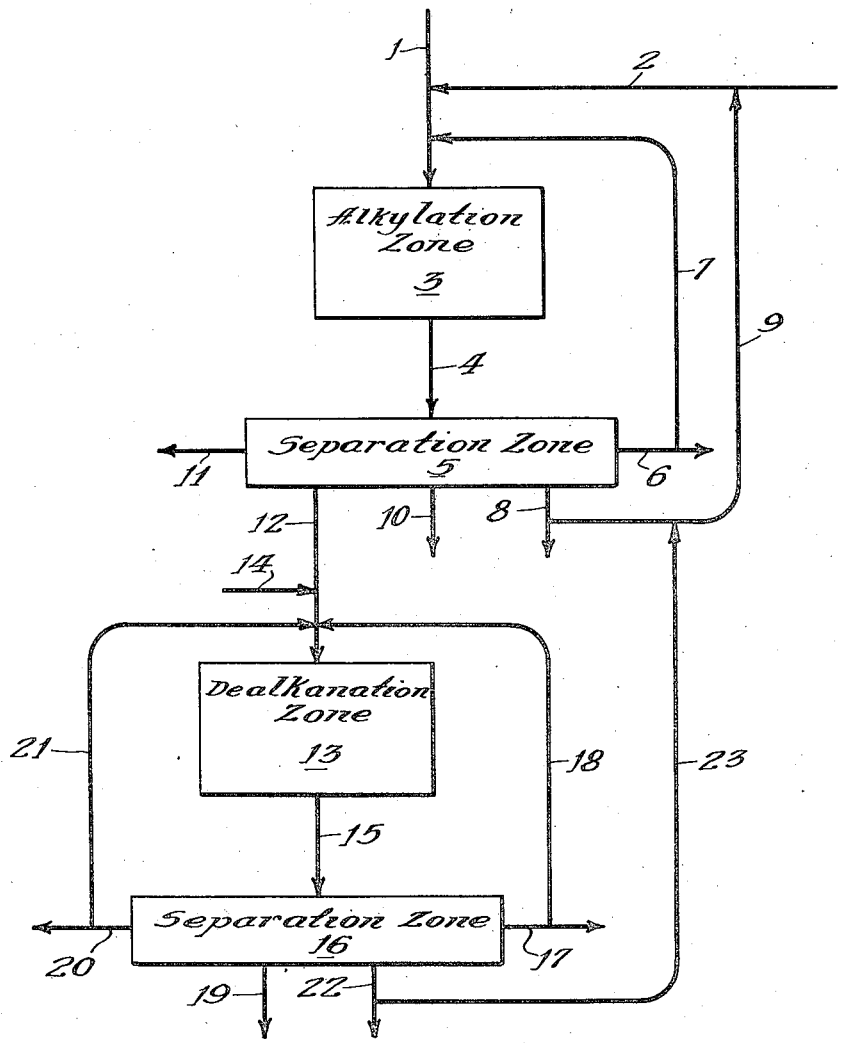
Inventor:
William J. Mattox
By: Lee J. Gary
Attorney Patented Oct. 16, 1945

2,386,969

UNITED STATES PATENT OFFICE 2,386,969

PRODUCTION OF XYLENE

William J. Mattox, Riverside, Ill., assignor to Universal Oil Products Company, Chicago, Ill., a corporation of Delaware Application November 19, 1943, Serial No. 510,885

9 Claims. (Cl. 260—672)

This invention relates to the production of xylene from a di-alkyl aromatic hydrocarbon in which at least one of the alkyl groups contains two or more carbon atoms to the molecule. More particularly, it relates to the conversion of a di-alkyl aromatic hydrocarbon such as di-ethylbenzene into xylene by reducing the length of the alkyl group or groups to leave di-methylbenzene which is also known as xylene.

In the alkylation of benzene with ethylene in order to produce mono-ethylbenzene, there is unavoidably produced varying amounts of di-ethylbenzene, depending upon the conditions of operation and particularly upon the amount of ethylene present in the reaction zone. It is an object of the present invention to convert the di-ethylbenzene into xylene, the latter being in demand for various uses including blending in aviation gasoline in order to increase its anti-knock properties.

In a broad aspect the present invention relates to a process for manufacturing xylene which comprises subjecting a di-alkylbenzene having at least 2 carbon atoms in at least one of the alkyl side chains, to dealkanation in the presence of a dealkanation catalyst under dealkanation conditions to reduce the length of the alkyl side chain of at least 2 carbon atoms to 1 carbon atom.

In one specific embodiment the present invention relates to a process for producing xylene which comprises subjecting di-ethylbenzene to dealkanation in the presence of hydrogen and a catalyst comprising a composite of alumina and an oxide of a metal selected from the group consisting of the elements in the left-hand column of group VI in the periodic table at a temperature of from about 400° to about 650° C.

In another specific embodiment the present invention relates to a process for manufacturing mono-ethylbenzene and xylene, which comprises subjecting benzene to alkylation with ethylene in the presence of an alkylation catalyst to produce mono-ethylbenzene and at the same time forming di-ethylbenzene, and subjecting said di-ethylbenzene to dealkanation in the presence of hydrogen and a catalyst comprising a composite of alumina and an oxide of a metal selected from the group consisting of the elements in the left-hand column of group VI in the periodic table at a temperature of from about 400° to about 650° C.

The term "dealkanation" as used in the present specification and claims is intended to define the reaction in which an alkyl side chain of more than 2 carbon atoms undergoes scission at the bond between the alpha and beta carbon atoms. Stated in another way, the term "dealkanation" defines the splitting off of a portion of an alkyl side chain in order to leave a methyl radical attached to the aromatic ring.

The di-alkylbenzene charging stock suitable for treatment in the present invention is one in which at least one of the alkyl side chains contains 2 or more carbon atoms to the molecule and preferably are the meta and para alkyl derivatives. Thus such compounds as methyl-ethylbenzene, methyl-propylbenzene, methyl-butylbenzene, etc., or such compounds as di-ethylbenzene, ethyl-propylbenzene, ethyl-butyl-benzene, etc., or such compounds as di-propylbenzene, propyl-butylbenzene, etc., or such compounds as di-butylbenzene, butyl-amylbenzene, etc., may be converted in accordance with the present invention to form xylene. It is understood that the yields of xylene produced from these various alternative compounds are not necessarily equivalent. It is generally preferred, however, that the alkyl side chains contain not more than 3 carbon atoms, a particularly preferred charging stock comprising di-ethylbenzene.

In the following further explanation of the invention, the description will be limited to a process in which di-ethylbenzene is subjected to dealkanation, with the understanding that the process is applicable to the other di-alkylbenzenes heretofore set forth, but also with the understanding that the specific operating conditions may have to be modified when treating the other di-alkylbenzenes as compared to treating di-ethylbenzene. However, the conditions for treating these other di-alkylbenzenes will be within the range hereinafter set forth.

The present invention is also applicable to the treatment of a tri-alkyl aromatic hydrocarbon in which at least one of the alkyl side chains contains at least 2 carbon atoms in order to produce a tri-methyl aromatic hydrocarbon.

In accordance with the present invention, dealkanation of di-ethylbenzene to produce xylene is effected in the presence of a catalyst comprising a composite alumina or other suitable supporting materials and an oxide of a metal selected from the group consisting of the elements in the left-hand column of group VI in the periodic table. Preferred catalysts comprise composites of alumina with chromia or molybdena.

The dealkanation is effected in the presence of the hereinbefore specified catalysts at a temperature of from about 400° to about 650° C. and preferably of from about 500° to about 600° C., a pressure of from atmospheric to 1000 pounds, or more, per square inch and preferably of from about 100 to about 400 pounds, and a hourly weight space velocity of from about 0.1 to 5 or more, and preferably from about 0.2 to about 2. As used herein, the term "hourly weight space velocity" is intended to mean the weight of hydrocarbon per hour per weight of catalyst in the reaction zone. It is understood that the temperature, pressure and space velocity will be correlated to produce the desired results.

The dealkanation reaction is preferably effected in the presence of hydrogen which has been introduced from an extraneous source or which has been recycled within the system. The amount of hydrogen so introduced is within the range of from about 0.5 to 15 mols or more, and preferably of from about 1 to about 10 mols, per mol of di-ethylbenzene. During the dealkanation reaction, and particularly with relatively high conversions per pass, some hydrogen will be produced as a result of side reactions and, in certain cases, the hydrogen so produced may be sufficient for the purpose intended. In such cases it may be unnecessary to introduce hydrogen from an extraneous source and even in some extreme cases it may be unnecessary to recycle hydrogen within the system. Usually, however, it will be advisable to recycle the hydrogen from the separation step of the process to the dealkanation step.

The invention will be further explained in describing the accompanying diagrammatic flow drawing which illustrates one specific embodiment of the invention, but not with the intention of unduly limiting the same.

Referring to the drawing, ethylene is introduced to the process through line 1 and is supplied, together with benzene introduced to the process through line 2, into alkylation zone 3. Zone 3 may be of any suitable design in which the alkylation catalyst is disposed and in which the benzene and ethylene are satisfactorily contacted therewith. The alkylation of benzene with ethylene or other normally gaseous olefins may be effected by means of well known catalysts such as phosphoric acid, sulfuric acid, zinc chloride, aluminum chloride, silica-alumina, hydrogen fluoride, etc. under suitable conditions of temperature, pressure and reaction time. A preferred alkylation catalyst comprises a calcined composite of phosphoric acid and a siliceous carrier, such as kieselguhr, this composite being hereinafter referred to as a solid phosphoric acid catalyst. Catalysts of this type are described in detail in U. S. Patents Nos. 1,993,512, 1,993,513, 2,067,764, 2,120,702, 2,157,208, and 2,275,183. Using this catalyst, the reaction temperature may be from about 150° to about 450° C. and preferably of about 225° to about 325° C. Pressures of from about 300 to about 2000 pounds per square inch may be employed and preferably of from about 500 to 1000 pounds per square inch. An excess of benzene is preferably employed and this may comprise a molar ratio of benzene to olefin of from about 1 to 25:1. With other alkylating catalysts, the operating conditions must be adjusted accordingly.

The alkylation products, which will include unconverted ethylene, unconverted benzene, mono-ethylbenzene and di-ethylbenzene, are directed through line 4 into separation zone 5. Zone 5 may comprise one or a plurality of suitable fractioning, distilling, absorbing and/or stripping means whereby the products introduced thereto may be separated into the desired fractions. Unconverted ethylene may be withdrawn from zone 5 through line 6 and may be removed from the process, but preferably at least a portion thereof is recycled by way of lines 7 and 1 to zone 3 for further conversion therein. Similarly, unconverted benzene may be withdrawn from zone 5 through line 8 and may be removed from the process, but preferably at least a portion thereof is recycled by way of lines 9, 2, and 1 to zone 3 for further conversion therein. Mono-ethylbenzene is withdrawn from zone 5 through line 10 and is recovered as one of the desired products of the process or it may be recycled, by well known means not shown, to zone 3 for conversion into di-ethylbenzene. Products boiling higher than di-alkylbenzene may be removed from zone 5 through line 11.

The di-alkylbenzene, which in the case here illustrated comprises di-ethylbenzene, is withdrawn from zone 5 through line 12 and is supplied to dealkanation zone 13. Hydrogen from an extraneous source may be introduced to the process through line 14 and supplied by way of line 12 into zone 13. Zone 13 may be of any suitable design in which the catalyst is disposed and in which the reactants are satisfactorily contacted therewith.

The reaction products from zone 13 are directed through line 15 into separation zone 16 which may be the same or different than separation zone 5, but will be suitable to separate a hydrogen containing fraction, a xylene containing fraction and unconverted di-ethylbenzene. The hydrogen containing fraction may be withdrawn from zone 16 through line 17 and may be removed from the process, but preferably at least a portion thereof is recycled by way of lines 18 and 12 to zone 13. When desired the hydrogen fraction may be subjected to purification or other treatment in order to concentrate the hydrogen prior to recycling. A xylene containing fraction is withdrawn from zone 16 through line 19 and is recovered as one of the desired products of the process. This fraction may, when desired, be subjected to any further fractionation or other treatment in order to separate the xylene from other constituents, if any. Unconverted di-ethylbenzene may be withdrawn from zone 16 through line 20 and may be removed from the process but preferably at least a portion thereof is recycled by way of lines 21 and 12 to zone 13 for further conversion therein. Likewise, this fraction may, when desired, be subjected to fractionation or other treatment in order to separate the unconverted di-ethylbenzene from other constituents, if any, prior to recycling.

Under certain conditions of operation, a minor proportion of benzene may be present in the dealkanation products and this benzene may be separated in zone 16 and withdrawn therefrom through line 22 and removed from the process but preferably at least a portion thereof is recycled by way of lines 23, 9, 2 and 1 to zone 3 for conversion therein.

The dealkanation products may also contain minor proportions of toluene, mono-ethylbenzene and, when ortho substituted di-alkylbenzenes are present, naphthalene or derivatives thereof. The toluene and mono-ethylbenzene may, if desired, be removed from the process or may be recycled, by well known means not illustrated, to alkylation zone 3 for further conversion therein, while the naphthalene or derivatives thereof may be recovered from zone 16 by well known means not shown.

The above description of the drawing is directed to the alkylation of benzene with ethylene. As heretofore set forth, other normally gaseous olefins, such as propylene and/or butylene or mixtures thereof with ethylene, may be utilized in alkylating the benzene. Ethylene, however, is preferred as the alkylating agent.

The following examples are introduced for the purpose of further illustrating the novelty and utility of the present invention, but not with the intention of unduly limiting the same.

Example I

A charge of 2 mols of benzene and one mol of ethylene may be alkylated in the presence of a solid phosphoric acid catalyst at a temperature of 275° C. and a pressure of 800 pounds per square inch. The products will comprise a major proportion of mono-ethylbenzene and a minor proportion of di-ethylbenzene. The di-ethylbenzene may be subjected to dealkanation in the presence of an alumina-chromia catalyst at a temperature of 525° C., a pressure of 200 pounds per square inch and a space velocity of 0.5 in the presence of 4 mols of hydrogen per mol of di-ethylbenzene. 88.3% by weight of liquid products per pass is recovered from the reaction products and this will comprise about 35% by weight of xylene and about 50% by weight of unconverted di-ethylbenzene. The latter may be recycled to the dealkanation zone in order to produce an ultimate yield of xylene from di-ethylbenzene of 70% or more by weight.

Example II

A di-ethylbenzene charging stock was subjected to dealkanation in the presence of an alumina-molybdena catalyst at a temperature of 525° C., a pressure 200 pounds per square inch and a space velocity of 0.5 in the presence of 4 mols of hydrogen per mol of di-ethylbenzene to yield 80.1% per pass by weight of liquid products of which about 40% by weight is xylene and about 35% by weight is unconverted di-ethylbenzene.

I claim as my invention:

1. A process for the dealkanation of a polyalkyl aromatic hydrocarbon having an alkyl group of at least 2 carbon atoms, which comprises contacting said hydrocarbon with a catalyst comprising an oxide of an element from the left-hand column of group VI of the periodic table at a temperature of from about 400° C. to about 650° C., a pressure of from atmospheric to about 1000 pounds per square inch and an hourly weight space velocity of from about 0.1 to about 5, whereby to split said alkyl group at the bond between its alpha and beta carbon atoms and leave a methyl radical attached to the aromatic nucleus.

2. The process as defined in claim 1 further characterized in that said hydrocarbon is contacted with the catalyst in the presence of hydrogen in the amount of from about 0.5 to about 15 mols per mol of the hydrocarbon.

3. A process for producing xylene from a dialkylbenzene hydrocarbon having an alkyl group of at least 2 carbon atoms, which comprises contacting said hydrocarbon with a catalyst comprising an oxide of an element from the left-hand column of group VI of the periodic table at a temperature of from about 400° C. to about 650° C., a pressure of from atmospheric to about 1000 pounds per square inch and an hourly weight space velocity of from about 0.1 to about 5, whereby to reduce the number of carbon atoms of said alkyl group to one.

4. The process as defined in claim 3 further characterized in that said hydrocarbon is contacted with the catalyst in the presence of hydrogen in the amount of from about 0.5 to about 15 mols per mol of the hydrocarbon.

5. The process of claim 3 further characterized in that said catalyst comprises a composite of alumina and chromia.

6. The process of claim 3 further characterized in that said catalyst comprises a composite of alumina and molybdena.

7. A process for producing xylene which comprises contacting di-ethylbenzene with a catalyst comprising an oxide of an element from the left-hand column of group VI of the periodic table at a temperature of from about 400° C. to about 650° C., a pressure of from atmospheric to about 1000 pounds per square inch and an hourly weight space velocity of from about 0.1 to about 5 in the presence of hydrogen in the amount of from about 0.5 to about 15 mols per mol of di-ethylbenzene.

8. The process as defined in claim 7 further characterized in that said catalyst comprises alumina and chromia.

9. The process as defined in claim 7 further characterized in that said catalyst comprises alumina and molybdena.

WILLIAM J. MATTOX.